(12) United States Patent
Minegishi et al.

(10) Patent No.: US 7,070,232 B2
(45) Date of Patent: Jul. 4, 2006

(54) BREATHABLE SEAT

(75) Inventors: Takeshi Minegishi, Sagamihara (JP);
Kazuo Kikuchi, Yokohama (JP);
Takashi Ebihara, Yokohama (JP)

(73) Assignee: NHK Spring Co., Ltd., Yokohama (JP)

( * ) Notice: Subject to any disclaimer, the term of this patent is extended or adjusted under 35 U.S.C. 154(b) by 294 days.

(21) Appl. No.: 10/642,431

(22) Filed: Aug. 15, 2003

(65) Prior Publication Data
US 2004/0104607 A1 Jun. 3, 2004

(30) Foreign Application Priority Data
Aug. 15, 2002 (JP) ............................. 2002-236961

(51) Int. Cl.
*A47C 7/74* (2006.01)
(52) U.S. Cl. .............................. 297/180.14; 297/452.47
(58) Field of Classification Search ............. 297/180.1, 297/180.13, 180.14, 452.42, 452.46, 452.47
See application file for complete search history.

(56) References Cited

U.S. PATENT DOCUMENTS

| | | | |
|---|---|---|---|
| 3,506,308 A * | 4/1970 | Fenton ................... | 297/452.47 |
| 3,818,522 A * | 6/1974 | Schuster ................. | 297/452.47 |
| 4,944,992 A * | 7/1990 | Yoneshige et al. ....... | 297/219.1 |
| 5,544,942 A | 8/1996 | Vu Khac et al. ........ | 297/452.37 |
| 5,902,014 A * | 5/1999 | Dinkel et al. ........... | 297/452.43 |
| 6,003,950 A * | 12/1999 | Larsson ................... | 297/452.42 |
| 6,062,641 A * | 5/2000 | Suzuki et al. ............ | 297/180.1 |
| 6,186,592 B1 * | 2/2001 | Orizaris et al. ......... | 297/180.12 |
| 6,629,725 B1 * | 10/2003 | Kunkel et al. .......... | 297/180.12 |
| 6,808,230 B1 * | 10/2004 | Buss et al. .............. | 297/180.12 |

FOREIGN PATENT DOCUMENTS

| | | |
|---|---|---|
| DE | 100 02 464 C 1 | 8/2001 |
| FR | 1.313.337 | 12/1962 |
| JP | 4-14848 | 3/1992 |
| JP | 6-12688 | 4/1994 |
| JP | 10-248685 | 9/1998 |
| JP | 10 248685 A | 12/1998 |

OTHER PUBLICATIONS

European Search Report No. 03255084.0-1251, dated Nov. 11, 2003.

* cited by examiner

*Primary Examiner*—Peter R. Brown
(74) *Attorney, Agent, or Firm*—Ohlandt, Greeley, Ruggiero & Perle LLP.

(57) ABSTRACT

A breathable seat comprises a seat body formed of urethane foam, a three-dimensional network cushion body incorporated in that region of the seat body which bears a user's body, a seat cover having breathability, and a pan frame. The cushion body is formed of a large number of continuous linear elements of thermoplastic resin. The linear elements are looped windingly so that their respective contact portions are fused together. The seat body is formed having venting holes that penetrate the urethane foam in its thickness direction. The venting holes communicate with the cushion body and apertures of the pan frame. The seat cover envelops the seat body and the cushion body.

8 Claims, 4 Drawing Sheets

BREATHABLE SEAT

CROSS-REFERENCE TO RELATED APPLICATIONS

This application is based upon and claims the benefit of priority from the prior Japanese Patent Application No. 2002-236961, filed Aug. 15, 2002, the entire contents of which are incorporated herein by reference.

BACKGROUND OF THE INVENTION

1. Field of the Invention

The present invention relates to breathable seats used for seats, chairs, etc. in means of transportation, such as cars, watercraft, aircraft, etc.

2. Description of the Related Art

Described in Jpn. Pat. Appln. KOKOKU Publication No. 4-14848 (prior art 1) and Jpn. UM Appln. KOKOKU Publication No. 6-12688 (prior art 2) are breathable seats that are formed of a fibrous cushion (fibrous layer) and urethane foam molded integrally with each other. In the seat described in the prior art 1, the fibrous layer is pushed by a foaming pressure that is produced as a stock solution of urethane foam is injected for molding. When the seat is removed from a mold, the fibrous layer is released from the foaming pressure of the urethane foam and restored, so that it cannot obtain given dimensions. In the seat described in the prior art 2, the urethane foam stock solution gets into the fibrous layer as it foams, so that the boundary between the fibrous layer and the urethane foam hardens. Since the seat cannot easily obtain a satisfactory foaming pressure, moreover, it cannot enjoy necessary hardness for a cushion body.

On the other hand, a seat that is described in Jpn. Pat. Appln. KOKAI Publication No. 10-248685 (prior art 3) is a composite structure that combines a fibrous resilient body and urethane foam. This seat comprises an obverse pad layer formed of the fibrous resilient body and a reverse pad layer formed of the urethane foam on the back of the obverse pad layer. The obverse pad layer has a substantially fixed thickness throughout its area. According to this seat, the density of the fibrous resilient body is subject to little dispersion, and the hot-molding time can be shortened. As compared with a full-form structure of a fibrous resilient body, the composite-structure seat is improved in flexibility and hardness.

However, these conventional seats cannot be satisfactorily prevented from becoming nonbreathing and cannot readily enjoy good cushioning properties.

BRIEF SUMMARY OF THE INVENTION

Accordingly, the object of the present invention is to provide a breathable seat capable of being satisfactorily prevented from becoming nonbreathing and enjoying good cushioning properties.

A breathable seat according to the present invention comprises a seat body formed of urethane foam and having venting holes extending in the thickness direction of the urethane foam, a three-dimensional network cushion body incorporated in that region of the seat body which bears a user's body, having a three-dimensional reticulated structure, in which a large number of continuous linear elements of thermoplastic resin are looped windingly so that the respective contact portions thereof are fused together, and communicating with the venting holes, and a seat cover which has breathability and envelops the seat body and the three-dimensional network cushion body.

The breathable seat of the invention can be satisfactorily prevented from being rendered nonbreathing by a user's perspiration or the like and can enjoy good cushioning properties.

If the seat body is supported by means of a pan frame having apertures, according to the invention, the apertures should be aligned individually with the venting holes. By doing this, the damping force of the seat can be proportioned to the gross sectional area of the venting holes in some measure, so that it can be set with ease.

Preferably, the gas permeability of the seat cover is 10 $cc/cm^2/sec$ or more. If the diameter of each continuous linear element ranges from 0.1 to 1.0 mm, the touch of the surface of the seat is improved.

Preferably, the gross sectional area of the venting holes ranges from 1.8 to 76 $cm^2$, and the logarithmic decrement of the seat determined by a free-fall damping test ranges from 0.75 to 1.52. Each of the venting holes may be provided with a check valve which restrains air from flowing from the three-dimensional network cushion body toward the lower end of the venting hole.

Preferably, moreover, an end portion of the three-dimensional network cushion body is buried in the seat body in a manner such that a bonded surface between the seat body and the cushion body is inclined at an angle of 90° or less (e.g., 30°) to an upper surface of the seat body at junctions between the seat body and the cushion body.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Figure 1:
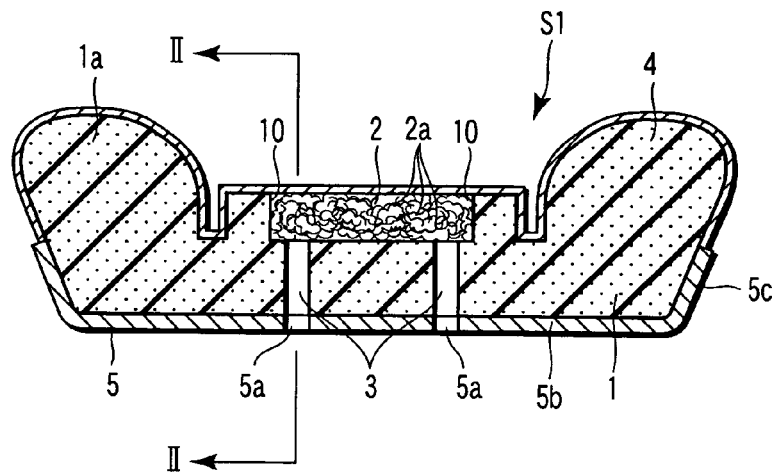
FIG. 1 is a sectional view of a seat according to a first embodiment of the invention.

A breathable seat according to a first embodiment of the present invention will now be described with reference to FIGS. 1 to 4. A breathable seat S1 shown in FIG. 1 comprises a seat body 1 formed of urethane foam 1a, a three-dimensional network cushion body 2, a seat cover 4 having breathability, and a pan frame 5 that supports the seat body 1. The cushion body 2 is incorporated in that region of the seat body 1 which bears a user's body. The pan frame 5 has a bottom wall 5b in the form of a plate and a sidewall 5c that is formed around the bottom wall 5b. The breathable seat 51 is used for a seat cushion of a vehicle seat, for example.

At least two venting holes 3 are formed in the urethane foam 1a that constitutes the seat body 1. The holes 3 extend in the thickness direction of the foam 1a (or in the vertical direction of FIG. 1) and open into the three-dimensional network cushion body 2. The urethane foam 1a, which is a continuous foam, in general, has gas permeability of 100 $cc/cm^2/sec$ or less (e.g., 60 $cc/cm^2/sec$ or thereabout). The foam 1a and the cushion body 2 are bonded with an adhesive agent of synthetic rubber at their junctions 10.

The three-dimensional network cushion body 2 has a three-dimensional reticulated structure (network structure), in which a large number of continuous linear elements 2a of thermoplastic resin are looped windingly so that their respective contact portions are fused together. The seat cover 4 envelops the seat body 1 and the cushion body 2.

An example of the three-dimensional network cushion body 2 is formed of the continuous linear elements 2a of thermoplastic resin that have a diameter of 0.1 to 1.0 mm (100 to 10,000 deniers), and preferably 0.2 to 0.5 mm (300 to 2,000 deniers). The thermoplastic resin may be a thermoplastic elastomer resin that is formed of thermoplastic polyester elastomer mixed with thermoplastic polyester elastomer and polyurethane elastomer, for example. The gas permeability of the cushion body 2 is 400 $cc/cm^2/sec$ or more.

An example of the seat cover 4 has a three-layer structure that is formed of a polyester fabric, wadding of polyurethane foam, and light-gage polyester cloth. Polyester cotton may be used for the wadding. The polyester wadding is preferable because of its improved breathing properties.

The pan frame 5 is formed having a plurality of apertures 5a that serve to reduce it weight. The apertures 5a and the venting holes 3 of the seat body 1 correspond to one another in position.

Figure 2:
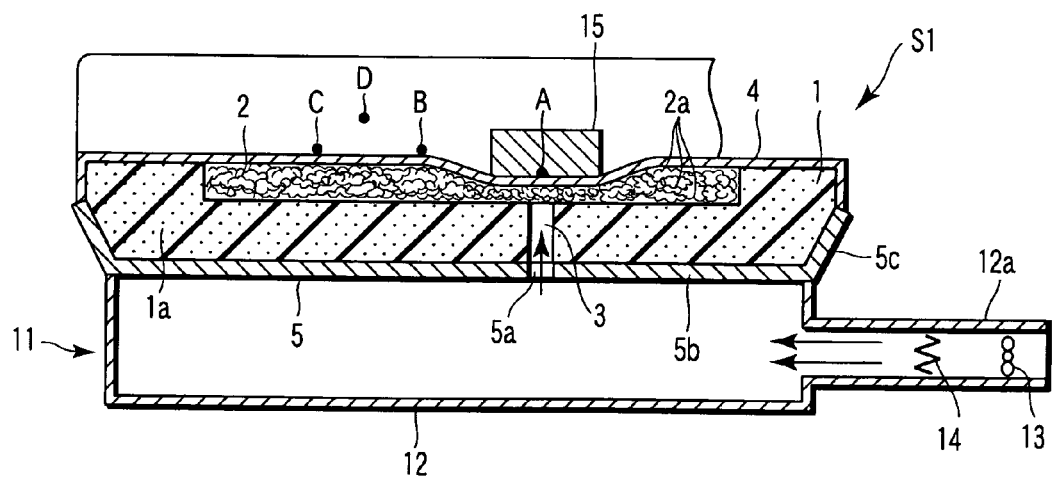
FIG. 2 is a sectional view of the seat taken along line II—II of FIG. 1, in which a hot blast generator is attached to the base of the seat.

In order to check the breathable seat S1 for gas permeability, a hot air generator 11 is located on the bottom wall 5b of the seat S1, as shown in FIG. 2, and loaded and non-load temperatures at points A, B, C and D are measured as hot air is fed into the three-dimensional network cushion body 2 through the venting holes 3. The hot blast generator 11 is provided with a blast fan 13 and a heater 14 that are located in an air intake portion 12a of a frame cover 12. Air that is introduced into the space inside the frame cover 12 by means of the blast fan 13 is heated by means of the heater 14. The resulting hot air is fed into the cushion body 2 through the apertures 5a of the pan frame 5 and the venting holes 3.

The point A is situated on the seat cover 4 and right over the venting holes 3. The point B is situated on the cover 4 at a forward distance of 10 cm from the point A. The point C is situated on the cover 4 at a forward distance of 20 cm from the point A. The point D is situated halfway between the points B and C and 5 cm above the cover 4. A columnar loading weight 15 has a diameter of 10 cm and weight of 5 kg, and is placed on the cushion body 2.

Figure 3:
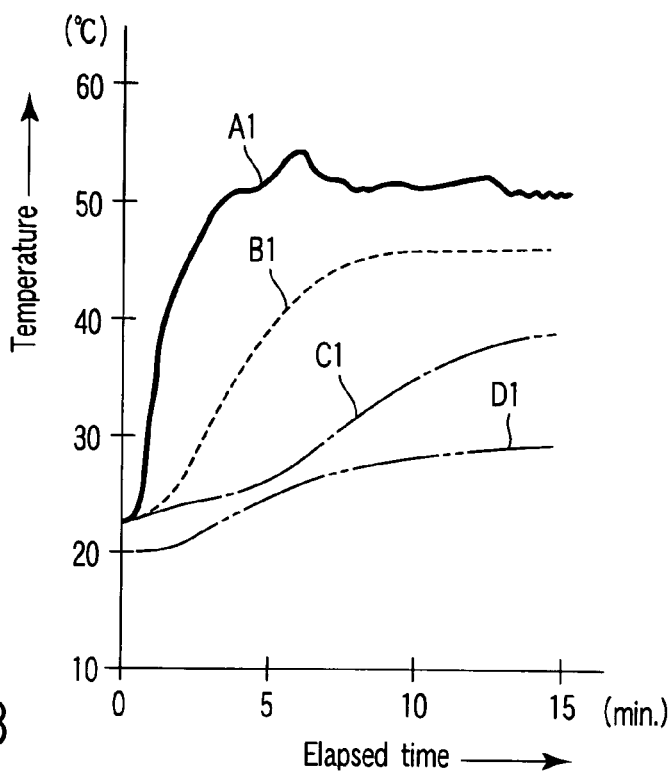
FIG. 3 is a diagram showing relations between no-load temperatures and elapsed times at points A, B, C and D for the seat shown in FIG. 2.
Figure 4:
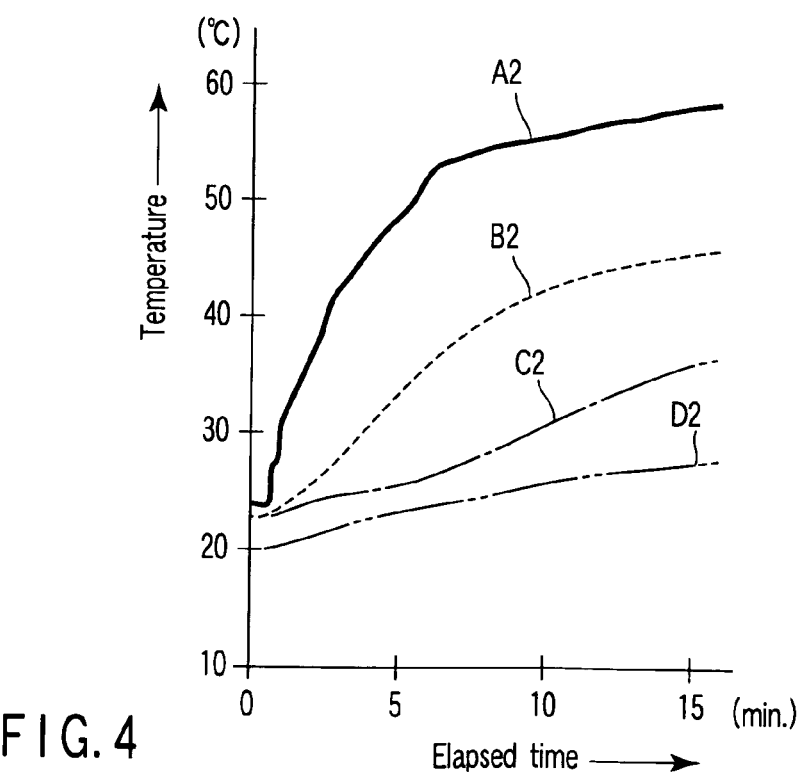
FIG. 4 is a diagram showing relations between loaded temperatures and elapsed times at points A, B, C and D for the seat shown in FIG. 2.

FIG. 3 shows no-load heat-up characteristics at the points A to D. FIG. 4 shows loaded heat-up characteristics at the points A to D. Curves A1 and A2 in FIGS. 3 and 4 individually represent the heat-up characteristics at the point A, and curves B1 and B2 individually represent the heat-up characteristics at the point B. Curves C1 and C2 individually represent the heat-up characteristics at the point C, and curves D1 and D2 individually represent the heat-up characteristics at the point D.

Figure 5:
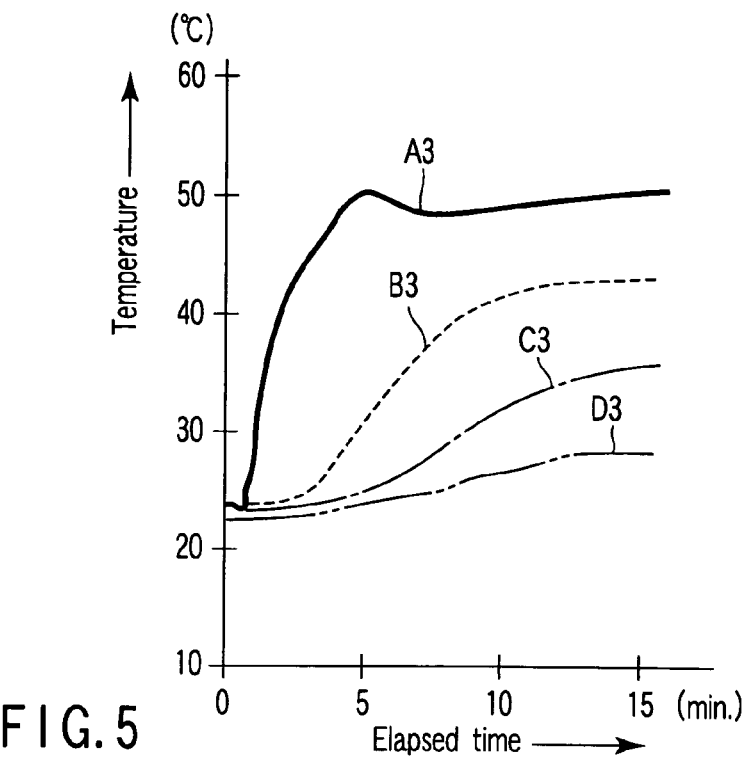
FIG. 5 is a diagram showing relations between no-load temperatures and elapsed times at points A, B, C and D for a comparative example using a fibrous cushion body.
Figure 6:
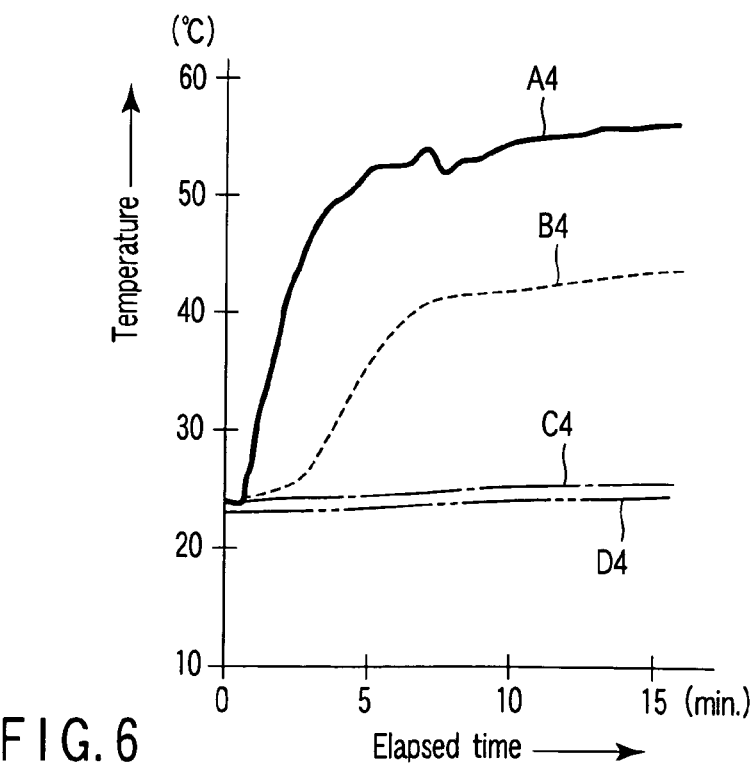
FIG. 6 is a diagram showing relations between loaded temperatures and elapsed times at points A, B, C and D for the comparative example using the fibrous cushion body.

A seat formed of a fibrous cushion body was manufactured as a comparative example. In this cushion body, confounded points of 6-denier synthetic fibers are bound together with a binder. The gas permeability of the comparative example is 150 $cc/cm^2/sec$. FIG. 5 shows the no-load heat-up characteristics of this comparative example at the points A to D, and FIG. 6 shows the loaded heat-up characteristics at the points A to D. Curves A3 and A4 in FIGS. 5 and 6 individually represent the heat-up characteristics at the point A, and curves B3 and B4 individually represent the heat-up characteristics at the point B. Curves C3 and C4 individually represent the heat-up characteristics at the point C, and curves D3 and D4 individually represent the heat-up characteristics at the point D.

In a no-load state, as seen from FIGS. 3 and 5, the seat S1 that uses the three-dimensional network cushion body 2, compared with the comparative example using the fibrous cushion body, has higher rates of temperature rise at the points A, B and C and a little better gas permeability. In a loaded state, as seen from FIGS. 4 and 6, moreover, the seat S1 that uses the cushion body 2, compared with the comparative example, has higher rates of temperature rise at all the points A to D. Thus, the seat that uses the three-dimensional network cushion body 2 was found to be better in gas permeability than a seat that uses the fibrous cushion body.

In the seat S1, the three-dimensional network cushion body 2 is incorporated in the sitting region of the seat body 1 that is formed of the urethane foam 1a. Therefore, air can move uniformly in the sitting portion that is touched by the user's body, so that the seat S1 can be prevented from being rendered nonbreathing by perspiration. Having the gas permeability of 400 $cc/cm^2/sec$ or more, the cushion body 2 allows free movement of air therein, so that its breathability is very high.

The three-dimensional network cushion body 2 is formed of the continuous linear elements 2a of thermoplastic resin that have a diameter of 0.1 to 1.0 mm (100 to 10,000 deniers), and preferably 0.2 to 0.5 mm (300 to 2,000 deniers). The continuous linear elements 2a are looped windingly so that their respective contact portions are fused together to form a three-dimensional reticulated structure. Accordingly, the surface of the cushion body 2 can providea comfortable touch without feeling rough or rugged. If the diameter of each continuous linear element is less than 0.1 mm, the strength and resilience of the cushion body 2 lower inevitably. If the diameter of each linear element exceeds 1.0 mm, the number of continuous linear elements per unit volume is reduced, so that the compression characteristic of the cushion body 2 worsens inevitably.

TABLE 1 shows the result of measurement of gas permeability on four types of seat covers (No. 1 to No. 4) that are different in breathability and are employed in the breathable seats S1 that use the three-dimensional network cushion body 2.

The seat cover No. 1 is formed of a leather outer member and a urethane slab wadding, and its overall gas permeability is 3 cc/cm$^2$/sec. The seat cover No. 2 is formed of a fabric outer member and a urethane slab wadding, and its gas permeability is 10 cc/cm$^2$/sec. The seat cover No. 3 is formed of a fabric outer member and a fibrous wadding, and its gas permeability is 30 cc/cm$^2$/sec. The seat cover No. 4 is formed of a bored fabric outer member and a fibrous wadding, and its gas permeability is 100 cc/cm$^2$/sec.

For the breathable seats S1 using these seat covers, the temperatures at the points A, B, C and D were measured in 15 minutes after hot air had been fed by means of the hot blast generator 11. TABLE 1 shows the result of the measurement.

seat cover changes. For the points B, C and D, there are definite relations between the gas permeability of the seat cover and the heat-up characteristics. More specifically, TABLE 1 indicates that the seat covers Nos. 2 to 4 having the gas permeability of 10 cc/cm$^2$/sec or more, compared with the seat cover No. 1, undergo steeper temperature rises at the points B, C and D, so that the seats using these covers are higher in overall gas permeability.

Figure 7:
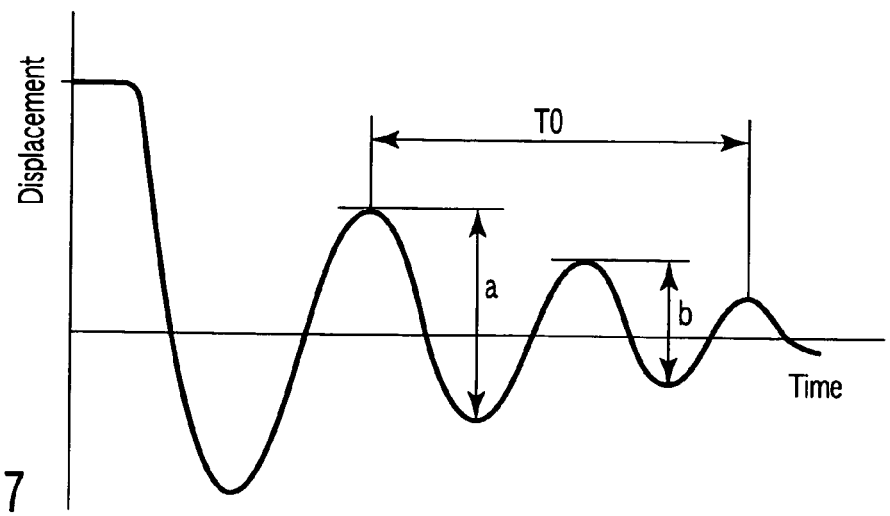
FIG. 7 is a diagram showing the relation between the amplitude of a pressure plate and time in a free-fall damping test.

TABLE 2 shows the result of measurement of the logarithmic decrement for seven types of seats of which the venting holes 3 and the apertures 5a have different configurations. The logarithmic decrement is a value that is obtained by a free-fall damping test. In the free-fall damping test, a pressure plate of 50-kg weight is dropped onto the bearing surface of the seat, and the relation between time and the change of the amplitude of the pressure plate is measured. The maximum height of the fall is 50 mm, and the measurement is conducted after a preliminary fall. If the relation between the amplitude of the pressure plate and time is represented by the wavy line of FIG. 7, the logarithmic decrement is obtained by ln(a/b). In FIG. 7, $T_0$ indicates a time interval twice as long as the oscillation period.

Figure 8:
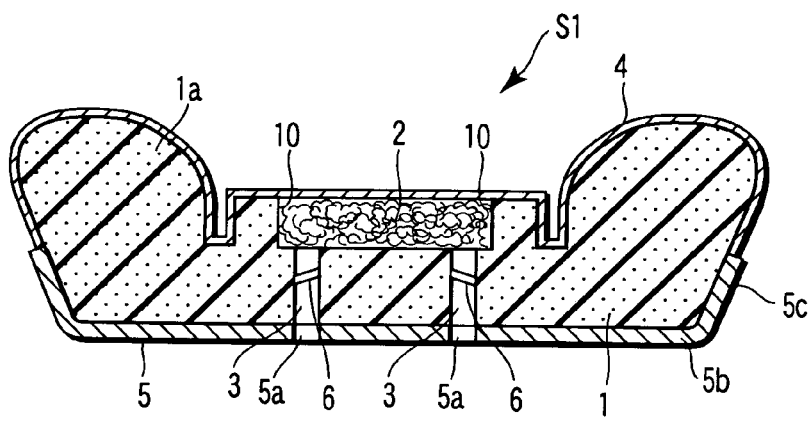
FIG. 8 is a sectional view of a seat according to a second embodiment of the invention.

In the seats Nos. 5 to 8 shown in TABLE 2, the venting holes 3 and the apertures 5a of the pan frame 5 correspond to one another in position. As shown in FIG. 8, check valves 6 are arranged individually in the venting holes 3 of the seat No. 8. The check valves 6 restrain air from flowing from the three-dimensional network cushion body 2 toward the respective lower ends of the venting holes 3. In the seats At the point A, as seen from TABLE 1, the heat-up characteristics hardly change if the gas permeability of the Nos. 9 to 11, the respective positions of the venting holes 3 and the apertures 5a are not coincident.

TABLE 1

| No. | Composition of seat cover | | Gas permeability | Temp. at measuring points aft. pass. of 15 min. | | | |
|---|---|---|---|---|---|---|---|
| | Type of outer member | Wadding | cc/cm$^2$/sec | A | B | C | D |
| 1 | Leather | Urethane slab | 3 | 32 | 10 | 3 | 2 |
| 2 | Fabric | Urethane slab | 10 | 32 | 23 | 14 | 7 |
| 3 | Fabric | Fibrous wadding | 30 | 33 | 22 | 20 | 10 |
| 4 | Bored outer member | Fibrous wadding | 100 | 32 | 23 | 22 | 12 |

TABLE 2

| No. | Positions of venting holes apertures of pan frame | Venting holes | | | Logarithmic decrement |
|---|---|---|---|---|---|
| | | Diameter (mm) | Number | Gross sectional area (cm$^2$) | |
| 5 | Coincident | 40 | 6 | 75.4 | 0.75 |
| 6 | | 40 | 2 | 25.1 | 1.16 |
| 7 | | 15 | 1 | 1.8 | 1.35 |
| 8 | Coincident (check value) | 40 | 2 | 25.1 | 1.50 |
| 9 | Not coincident | 40 | 6 | 75.4 | 1.52 |
| 10 | | 40 | 2 | 25.1 | 1.48 |
| 11 | | 40 | 1 | 12.6 | 1.51 |

According to the result of TABLE 2, the respective logarithmic decrements of the seats Nos. 5 to 11 range from 0.75 to 1.52. These values fulfill the requirements of vehicle seats. In the seats Nos. 5 to 8 that have their venting holes 3 and apertures 5a coincident with one another, their damping force can be set with ease, since it is proportional to the gross sectional area of the venting holes 3 in some measure. According to this embodiment, the gross sectional area of the venting holes 3 is adjusted to 1.8 to 75.4 cm² so that the logarithmic decrement ranges from 0.75 to 1.52 when the free-fall damping test is executed. Thus, the obtained damping force is suited for the vehicle seats.

If the seat body 1, which is formed of high-resilience urethane foam, and the three-dimensional network cushion body 2 are compressed repeatedly, their residual sets vary from each other. After prolonged use, therefore, the respective junctions 10 of the seat body 1 and the cushion body 2 are subject to a difference in level, so that the seat may become less comfortable to sit in, in some cases. The following is a description of means for preventing the difference in level.

Figure 9A:
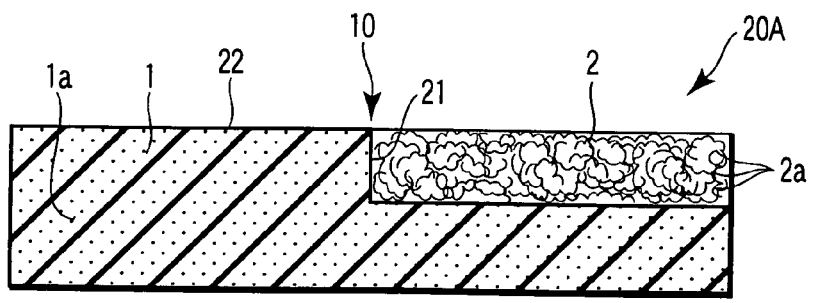
FIG. 9A is a sectional view showing a sample of a combination of urethane foam and a three-dimensional network cushion body shown in FIG. 1.
Figure 9B:
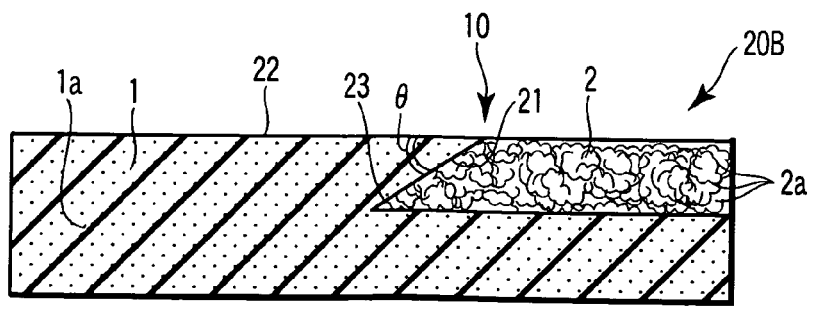
FIG. 9B is a sectional view showing a sample of a combination of urethane foam and a three-dimensional network cushion body of a seat according to a third embodiment of the invention.

A sample 20A shown in FIG. 9A and a sample 20B shown in FIG. 9B were manufactured by bonding together high-resilience urethane foam with hardness of 196 N/200φ and a three-dimensional network cushion body having the same hardness with an adhesive agent of an organic-solvent type based on synthetic rubber. In the sample 20A, a bonded surface 21 between the urethane foam 1a and the three-dimensional network cushion body 2 extends at right angles to an upper surface 22 of the seat body 1. This is called perpendicular bonding.

In the sample 20B, an end portion 23 of the three-dimensional network cushion body 2 is buried in the urethane foam 1a in a manner such that the bonded surface 21 between the urethane foam 1a and the cushion body 2 is inclined at an angle θ of 30° to the upper surface 22 of the seat body 1. This is called oblique bonding.

Each of the samples 20A and 20B measures 300 mm by 300 mm by 100 mm in thickness. In either sample, the urethane foam 1a and the three-dimensional network cushion body 2 were bonded substantially in the center with respect to its width direction in order to facilitate discrimination of the junctions 10. These samples 20A and 20B were subjected to a repeated compression test and checked for flattening or permanent set in fatigue. TABLE 3 shows the result of the test.

TABLE 3

|  | Repeated distortion (%) | Distortion difference (mm) |
| --- | --- | --- |
| Simple high-resilience urethane foam | 1 | 3 |
| Simple three-dimensional network cushion body | 4 |  |
| Perpendicular bonding (90°) |  |  |
| High-resilience urethane foam | 2 | 2 |
| Three-dimensional network cushion | 4 |  |
| Oblique bonding (30°) |  |  |
| High-resilience urethane foam | 2 | 0.9 |
| Three-dimensional network cushion | 3 |  |

The result shown in TABLE 3 indicates that the sample 20B in which the urethane foam 1a and the three-dimensional network cushion body 2 are bonded obliquely can better suppress the difference in level between the junctions 10 even after prolonged use and can be more comfortable to sit in. Thus, if the cushion body 2 is incorporated into the sitting region of the seat body 1 as they are bonded together, the junctions 10 between the urethane foam 1a and the cushion body 2 should be bonded obliquely. If the oblique bonding is used, the seat can continue to be comfortable to sit in for a long period of time even if there is some difference in level between the junctions 10.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A breathable seat comprising:
   a seat body formed of urethane foam and having venting holes extending in the thickness direction of the urethane foam;
   a three-dimensional network cushion body incorporated in that region of the seat body which bears a user's body, having a three-dimensional reticulated structure, in which a large number of continuous linear elements of thermoplastic resin are looped windingly so that the respective contact portions thereof are fused together, and communicating with the venting holes; and
   a seat cover which has breathability and envelops the seat body and the three-dimensional cushion body, wherein the gross sectional area of the venting holes ranges from 1.8 to 76 cm², and the logarithmic decrement of the seat determined by a free-fall damping test ranges from 0.75 to 1.52.

2. A breathable seat according to claim 1, wherein the gas permeability of the seat cover is 10 cc/cm²/sec or more.

3. A breathable seat according to claim 1, wherein the diameter of each continuous linear element ranges from 0.1 to 1.0 mm.

4. A breathable seat according to claim 1, wherein each said venting hole is provided with a check valve which restrains air from flowing from the three-dimensional network cushion body toward the lower end of the venting hole.

5. A breathable seat according to claim 1, wherein an end portion of the three-dimensional network cushion body is buried in the seat body in a manner such that a bonded surface between the seat body and the cushion body is inclined at an angle of 90° or less to an upper surface of the seat body at junctions between the seat body and the cushion body.

6. A breathable seat comprising:
   a seat body formed of urethane foam and having venting holes extending in the thickness direction of the urethane foam;
   a three-dimensional network cushion body incorporated in that region of the seat body which bears a user's body, having a three-dimensional reticulated structure, in which a large number of continuous linear elements of thermoplastic resin are looped windingly so that the respective contact portions thereof are fused together, and communicating with the venting holes;

a seat cover which has breathability and envelops the seat body and the three-dimensional cushion body; and a pan frame which supports the seat body, the pan frame having a bottom wall and a sidewall formed around the bottom wall, the bottom wall having a plurality of apertures corresponding to the venting holes in position, wherein the gross sectional area of the venting holes ranges from 1.8 to 76 cm$^2$, and the logarithmic decrement of the seat determined by a free-fall damping test ranges from 0.75 to 1.52.

7. A breathable seat according to claim 6, wherein each said venting hole is provided with a check valve which restrains air from flowing from the three-dimensional network cushion body toward the corresponding aperture.

8. A breathable seat according to claim 6, wherein an end portion of the three-dimensional network cushion body is buried in the seat body in a manner such that a bonded surface between the seat body and the cushion body is inclined at an angle of 90° or less to an upper surface of the seat body at junctions between the seat body and the cushion body.

* * * * *